(12) United States Patent
Schrade et al.

(10) Patent No.: US 9,463,772 B2
(45) Date of Patent: Oct. 11, 2016

(54) TENSIONING DRIVE FOR A SAFETY BELT DEVICE

(71) Applicant: Takata AG, Aschaffenburg (DE)

(72) Inventors: Wolfgang Schrade, Blaustein (DE); Hans-Juergen Divo, Langenau (DE); Armin Toth, Dornstadt (DE); Robert Fleischmann, Neu-Ulm/Pfuhl (DE); Gerhard Klingauf, Balzheim (DE); Heinrich Einsiedel, Ulm (DE); Ruediger Paulsen, Ulm (DE)

(73) Assignee: TAKATA AG, Aschaffenburg (DE)

( * ) Notice: Subject to any disclaimer, the term of this patent is extended or adjusted under 35 U.S.C. 154(b) by 110 days.

(21) Appl. No.: 14/292,479

(22) Filed: May 30, 2014

(65) Prior Publication Data

US 2014/0361113 A1 Dec. 11, 2014

(30) Foreign Application Priority Data

Jun. 10, 2013 (DE) ......................... 10 2013 210 766

(51) Int. Cl.
*B60R 22/46* (2006.01)

(52) U.S. Cl.
CPC .... *B60R 22/4628* (2013.01); *B60R 2022/4642* (2013.01)

(58) Field of Classification Search
CPC .............. B60R 22/46; B60R 22/4628; B60R 22/4633; B60R 22/4638; B60R 22/4642
USPC .................................................... 60/632, 638
See application file for complete search history.

(56) References Cited

U.S. PATENT DOCUMENTS

| 6,299,211 | B1 | 10/2001 | Wier | |
| 6,345,504 | B1* | 2/2002 | Takehara | B60R 22/4628 242/374 |
| 6,363,722 | B1* | 4/2002 | Takehara | B60R 22/4628 60/632 |
| 2007/0262186 | A1 | 11/2007 | Hiramat su | |
| 2011/0297776 | A1 | 12/2011 | Ito et al. | |

FOREIGN PATENT DOCUMENTS

| DE | 297 07 352 U1 | 8/1997 |
| DE | 199 27 270 A1 | 1/2001 |
| DE | 103 17 192 A1 | 12/2004 |
| DE | 699 20 615 T2 | 10/2005 |
| DE | 10 2008 004 969 A1 | 8/2008 |
| WO | WO 2005/080150 A1 | 9/2005 |
| WO | WO 2009/047252 A1 | 4/2009 |
| WO | WO 2011/050904 A1 | 5/2011 |
| WO | WO 2012/065655 A1 | 5/2012 |

* cited by examiner

*Primary Examiner* — Audrey K Bradley
(74) *Attorney, Agent, or Firm* — Gordon & Rees LLP (57) ABSTRACT

A tensioning drive for a safely belt device. The tensioning drive includes a gas generator, a drive wheel and a supply pipe which connects the gas generator and the drive wheel. A plurality of pushing members is included in the supply pipe. The pushing members are accelerated after the gas generator has been activated. The pushing members drive the drive wheel, and at least one of the pushing members completely or at least partially seals the supply pipe. The sealing action of the at least one sealing pushing member is ended or reduced after a predetermined distance has been travelled.

9 Claims, 9 Drawing Sheets

TENSIONING DRIVE FOR A SAFETY BELT DEVICE

The invention relates to a tensioning drive for a safety belt device.

Such a tensioning drive for a safety belt device is described in US patent specification U.S. Pat. No. 6,345,504. The previously known tensioning drive has a gas generator, a drive wheel and a supply pipe which connects the gas generator and the drive wheel to each other. In the supply pipe, there are provided a plurality of pushing members which are accelerated after the gas generator has been activated and which drive the drive wheel, whereby a safety belt of the safety belt device is tensioned. The first pushing member in the supply pipe when viewed from the gas generator has a sealing action and completely seals the supply pipe alone. In the previously known tensioning drive, the sealing sliding member is destroyed when the gas pressure within the supply pipe in the portion between the sealing pushing member and the gas generator becomes excessive. If a predetermined gas pressure is not exceeded, the sealing pushing member permanently maintains its sealing effect with respect to the supply pipe.

An object of the invention is to provide a tensioning drive which has better operational behaviour than the previously known tensioning drive.

Accordingly, there is provision according to the invention for the tensioning drive to be constructed in such a manner that the sealing action of the at least one sealing pushing member is ended or reduced after a predetermined distance has been travelled.

A significant advantage of the tensioning drive according to the invention can be seen in that it is ensured that, after the gas generator has been operated, a ventilation of the pressure space between the pushing members and the gas generator is carried out as soon as a predetermined distance has been travelled and a predetermined tensioning effect has been achieved. A pressure relief or a ventilation of the pressure space is, for example, advantageous in order to enable a backward movement of the pushing members after the tensioning operation has been completed.

Another significant advantage of the tensioning drive according to the invention can be seen in that, in spite of the ventilation provided, no hot gases of the gas generator can penetrate directly to the outer side. A discharge of the gas of the gas generator is carried out only after it has passed the pushing member which has become non-tight and all the other pushing members located therebehind. Owing to the fact that the gas of the gas generator has to flow round the previously sealing pushing member and the pushing members located therebehind, the gas is subjected to considerable losses in terms of temperature and pressure so that the gas discharge can no longer lead to any relevant danger.

A gas discharge can be carried out, for example, through the drive wheel or behind the drive wheel so that the supply pipe can advantageously be constructed without any holes. A hole-free construction of the supply pipe is therefore considered to be particularly advantageous.

Alternatively or additionally, however, a gas discharge can also be carried out through a ventilation hole fitted in the supply pipe or a plurality of ventilation holes fitted in the supply pipe; although such ventilation holes can in principle be arranged everywhere in the supply pipe, with respect to gas flowing around the drive members and optimum cooling and pressure reduction of the gas upstream of the gas outlet, a positioning of ventilation holes shortly upstream of the drive wheel is considered to be advantageous in order to ensure maximum flow length in the supply pipe.

The sealing pushing member is preferably formed by a pushing piston which forms the first pushing member in the supply pipe when viewed from the gas generator and which completely seals the supply pipe alone or in conjunction with another portion.

According to a first particularly preferred embodiment of the tensioning drive, there is provision for the sealing pushing member to lose its sealing action when introduced into a bent portion of the supply pipe and/or when introduced into a portion of the supply pipe, which portion has a different cross-section, as a result of the bending of the supply pipe and/or the cross-section change of the supply pipe.

It is advantageous for the sealing pushing member to be broken into at least two pieces, of which none completely seals the supply pipe alone, as a result of the bending of the supply pipe when introduced into a bent portion of the supply pipe or as a result of the cross-section change when introduced into the portion having a different cross-section.

Alternatively, there may be provision for the sealing pushing member to have a front sealing portion and a rear sealing portion which are in abutment with each other and which together seal the supply pipe and of which none completely seals the supply pipe alone, the two sealing portions being separated from each other when introduced into the bent portion of the supply pipe by the bending of the supply pipe or when introduced into the portion having a different cross-section by the cross-section change.

According to another preferred embodiment of the tensioning drive, there is provision for at least one through-hole to be provided which extends through the sealing pushing member or between the pushing member and the inner wall of the supply pipe and which is sealed by the pushing member located upstream of the sealing pushing member when viewed in the pushing direction, and for the sealing pushing member to remain fixed at a predetermined location, in particular in a bent portion of the supply pipe or a tapering location in the through-pipe, and to be separated from the pushing member located upstream of the sealing pushing member when viewed in the pushing direction with the through-hole being released.

According to another advantageous embodiment of the tensioning drive, there is provision for at least one through-hole to be provided which extends through the sealing pushing member or between the pushing member and the inner wall of the supply pipe and is first closed by a closure element which is fixed in position before the predetermined distance has been completely travelled, the closure element being separated from the pushing member after the predetermined distance has been travelled, whereby the through-hole is released and/or the pushing member is destroyed.

A portion of the closure element is preferably located in the portion of the supply pipe located upstream of the sealing pushing member when viewed in the pushing direction.

The portion of the closure element located upstream of the sealing pushing member is preferably fixed to the supply pipe, to the gas generator or between the supply pipe and the gas generator when viewed in the pushing direction.

It is considered to be particularly advantageous for the closure element to be a spring or to comprise a spring which is fixed in position with one spring end and which is suspended with the other spring end thereof in the through-hole.

According to another advantageous embodiment, there is provision for the closure element to be a strand-like member, in particular a wire, or to comprise a strand-like member which is fixed in position with one strand end, passes the through-hole with an intermediate portion and is located with the other strand end thereof at the side of the sealing pushing member remote from the gas generator, for the sealing pushing member to slide along the strand-like member away from the gas generator during the pushing movement thereof and, after the predetermined distance has been travelled, for the sealing pushing member to be separated from the strand-like member, whereby the through-hole is released.

Furthermore, there may be provision for the cross-section of the supply pipe to increase for the sealing pushing member after the predetermined distance has been travelled and for the sealing pushing member to lose its sealing action as a result of or at least also as a result of the cross-section increase of the supply pipe.

In an alternative embodiment of the tensioning drive, which embodiment is also considered to be advantageous, there is provision for the cross-section of the supply pipe for the sealing pushing member to decrease after the predetermined distance has been travelled and for the sealing pushing member to become damaged at the outer side when introduced into the region of reduced cross-section of the supply pipe and to lose its sealing action as a result of this damage or at least also as a result of this damage.

A reduction of the cross-section can be brought about in a particularly simple manner by stamping the supply pipe from the outer side; accordingly, it is considered to be advantageous for the reduction of the cross-section to be based on an external stamping of the supply pipe, which stamping tapers the inner wall of the supply pipe in an inward direction.

The invention is explained in greater detail below with reference to embodiments, in which, by way of example.

In the Figures, for the sake of clarity, the same reference numerals are always used for components which are identical or comparable.

Figure 1:
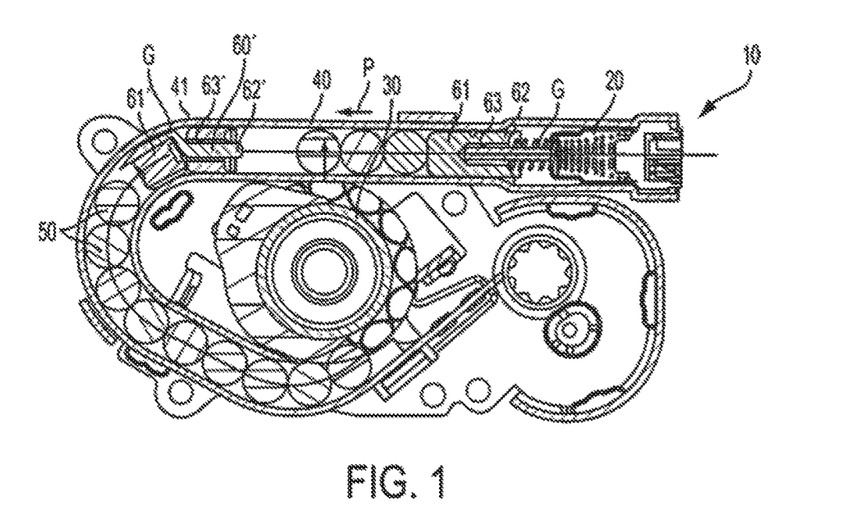
FIG. 1 shows an embodiment of a tensioning drive according to the invention, in which a pushing piston is constructed in two pieces and breaks after travelling a predetermined distance, whereby the sealing action of the pushing piston is lost.

FIG. 1 shows an embodiment of a tensioning drive 10 which is provided with a gas generator 20, a drive wheel 30 and a supply pipe 40, which connects the gas generator 20 and the drive wheel 30.

In the supply pipe 40 are a large number of spherical pushing members 50 which are driven by a pushing member which seals the supply pipe 40 and is in the form of a pushing piston 60.

In the embodiment according to FIG. 1, the pushing piston 60 has a front sealing portion 61 and a rear sealing portion 62. The rear sealing portion 62 is in radial abutment with the inner wall of the supply pipe 40 and seals the supply pipe 40 at the edge side.

As can be seen in FIG. 1, the rear sealing portion 62 is provided with a through-hole 63 which enables a gas flow G through the through-hole 63 and consequently through the rear sealing portion 62. The through-hole 63 and the rear sealing portion 62 are sealed by the front sealing portion 61 which is closed in the central region and has no through-hole at that location so that the pushing piston 60, as long as the front sealing portion 61 is in abutment with the rear sealing potion 62 or as long as the two sealing portions 61 and 62 are connected to each other, prevents a gas flow G through the pushing piston 60.

If, after operation of the gas generator 20, the pushing piston 60 is accelerated in the direction of arrow P, after travelling a predetermined distance it will be introduced into a bent portion 41 of the supply pipe 40 and be broken by the curvature of the bent portion 41 in such a manner that the front sealing portion is separated from the rear sealing portion. This state is also shown in FIG. 1: the pushing member located in the bent portion 41 is designated 60' at that location; the front sealing portion, which is separated in the bent portion 41 from the rear sealing portion, has the reference numeral 61' and the rear sealing portion is indicated with the reference numeral 62' after separation from the front sealing portion 61'.

FIG. 1 further shows how the gas flow G can pass the pushing piston 60' which has been broken apart by the gas flow G first passing the through-hole 63' in the rear sealing portion 62' and subsequently flowing past through the annular gap between the supply pipe 40 and the radially external outer wall of the front sealing portion 61'. In order to enable the gas flow G at the outer side at the front sealing portion

61', the diameter of the front sealing portion 61' is selected to be smaller than the diameter of the rear sealing portion 62'.

Figure 2:
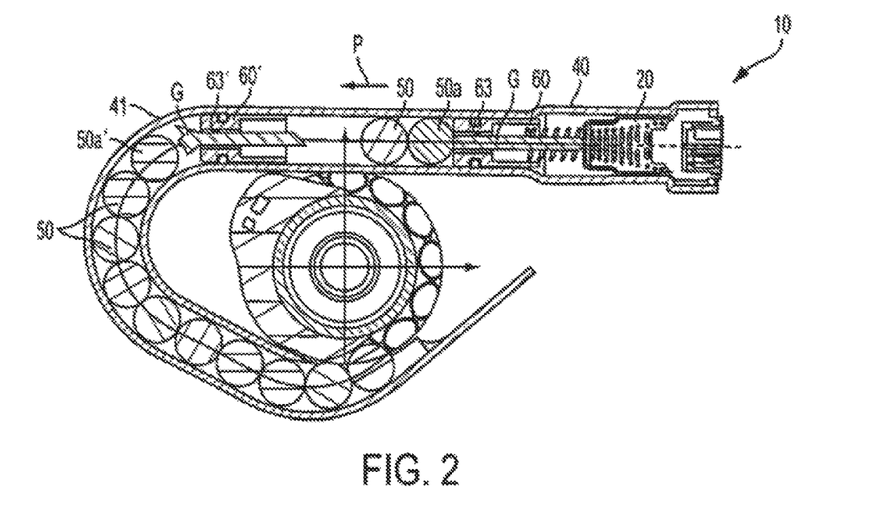
FIG. 2 shows an embodiment of a tensioning drive according to the invention, in which a pushing piston has a through-hole which is sealed by a pushing member which is located upstream of the pushing piston, as long as the pushing piston has not yet travelled a predetermined distance, and in which the through-hole, after the predetermined distance has been travelled, is released from the pushing member located upstream by means of the pushing piston being separated.

In summary, therefore, the pushing piston 60 in the embodiment according to FIG. 1 is constructed in such a manner that, after travelling a predetermined distance, which is delimited or defined by the beginning of the bent portion 41 of the supply pipe 40, it is broken into its two components, whereby the sealing effect of the pushing piston 60 is lost. FIG. 2 shows an embodiment of a tensioning drive 10, in which a pushing piston 60 itself does not bring about complete sealing with respect to the supply pipe 40. Complete sealing of the supply pipe 40 is carried out by means of cooperation of the pushing piston 60 with a pushing member 50a which is located directly upstream of the pushing piston 60 and which is, for example, spherical or has a different shape, and which seals a through-hole 63 in the pushing piston 60 as long as the pushing member 50a is placed directly upstream of the pushing piston 60.

In the embodiment according to FIG. 2, the shape of the pushing piston 60 is selected in such a manner that it can be pushed in the direction of arrow P through the supply pipe 40 as long as the supply pipe 40 is linear, at least substantially linear. As soon as the bending of the supply pipe 40 becomes excessive, as is the case in the bent portion 41, the pushing piston 60 will be clamped and remain stuck in the supply pipe 40.

The sticking of the pushing piston 60 in the bent portion 41 of the supply pipe 40 is also shown in FIG. 2. The pushing piston which is stuck in the bent portion 41 is given the reference numeral 60' therein. It can be seen that the pushing member 50a' which is located upstream of the pushing piston 60' is further driven by the gas flow G of the gas generator 20 and is separated from the pushing piston 60' since the gas flow G can pass the through-hole 63' in the pushing piston 60' and act directly on the pushing member 50a'.

In the embodiment according to FIG. 2, the pushing piston 60 consequently loses its sealing action with respect to the supply pipe 40 in that it remains stuck in the supply pipe 40 after travelling a predetermined distance and sealing of the through-hole 63 by the pushing member 50a located upstream of the pushing piston 60 is lost.

Alternatively, in the embodiment according to FIG. 2, there may also be provision for the pushing member 60 not to become clamped in the bent portion 41 and for the pushing member 60 to also pass the bent portions of the supply pipe 40. In this instance, non-tightness or cancelling of the sealing action may be based on a tilting of the pushing piston 60 relative to the pushing member 50a located in front in the bends in the supply pipe 40.

Figure 3:
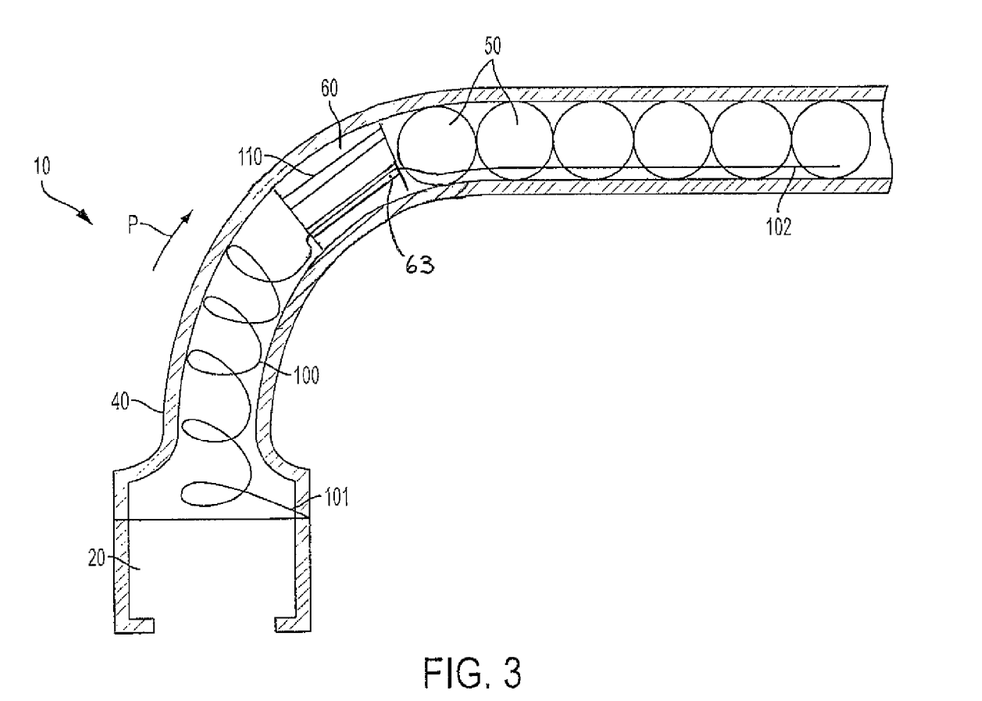
FIG. 3 shows an embodiment of a tensioning drive according to the invention in which a through-hole in a pushing piston is closed by means of a strand-like member in the form of a wire, as long as the pushing member has not yet completely travelled a predetermined distance and in which, by separating the pushing piston from the strand-like member after the predetermined distance has been travelled, the through-hole is released.

FIG. 3 shows an embodiment of a tensioning drive 10 in which a pushing piston 60 has a through-hole 63 through which a strand-like member 100 in the form of a wire extends. The diameter of the strand-like member 100 is selected in such a manner that the through-hole 63 in the pushing piston 60 is completely or at least almost completely sealed by the strand-like member 100.

FIG. 3 shows that a strand end 101 of the strand-like member is fixed in position in the region of the gas generator 20, whether it be in the region of the supply pipe 40 in the portion between the pushing piston 60 and the gas generator 20 or also in the region of the gas generator 20, for example, in the region between the gas generator 20 and the supply pipe 40.

The other strand end 102 of the strand-like member 100 is located at the side of the pushing piston 60 remote from the gas generator 20 or in the region of the spherical pushing member 50.

If the gas generator 20 is activated and the pushing piston 60 moves as a result of the gas of the gas generator 20 in the direction of the arrow P, the pushing piston 60 or the through-hole 63 thereof will slide along the strand-like member 100 until the strand end 102 is guided through the through-hole 63 and the through-hole 63 is released from the strand-like member 100. As soon as the pushing piston 60 has been separated from the strand-like member 100, the through-hole 63 is released, whereby a sealing of the supply pipe 40 is lost.

After travelling a predetermined distance which is determined by the length of the strand-like member 100, the pushing piston 60 thereof loses its sealing action so that the gas flow of the gas generator 20 can pass through the pushing piston 60.

In the embodiment according to FIG. 3, in addition to the through-hole 63 there is also provided a ventilation opening 110 which is always in a non-closed state and which enables a degree of gas flow through the pushing piston 60. However, the provision of such a ventilation opening 110 is only optional and therefore it may also be omitted.

Figure 4:
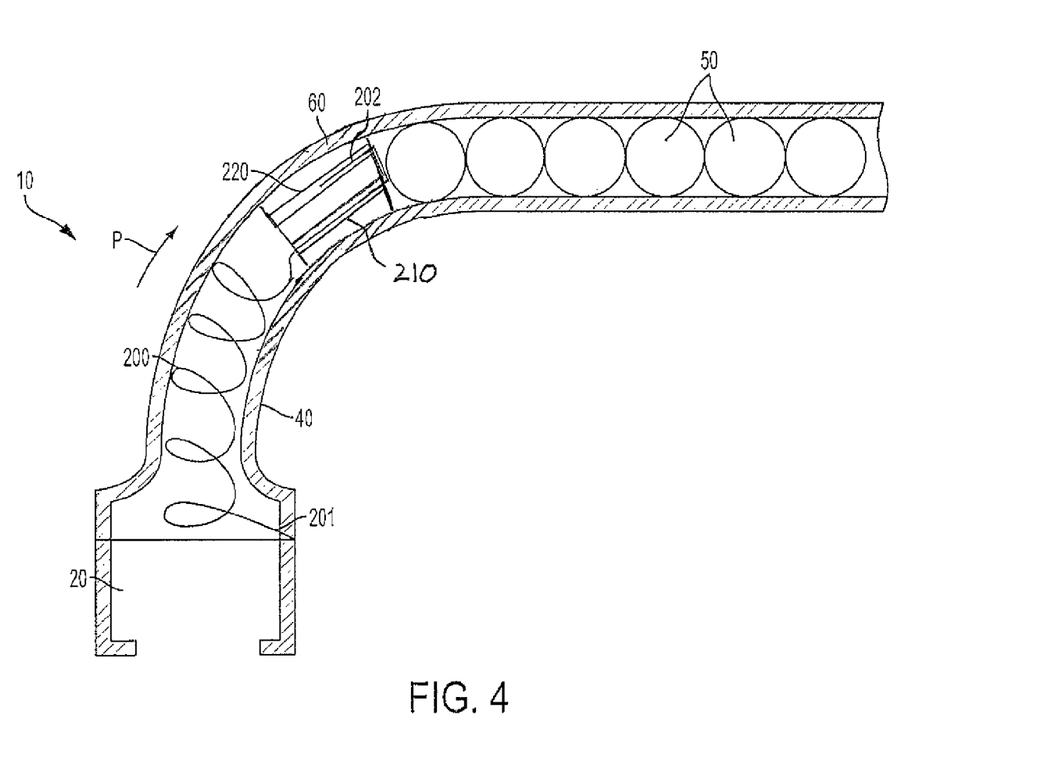
FIG. 4 shows an embodiment of a tensioning drive according to the invention, in which a through-hole in a pushing piston is closed by a spring end of a spring, whose other spring end is fixed in position, the pushing piston being separated from the spring after travelling a predetermined distance through the pushing piston and the through-hole being released.

FIG. 4 shows an embodiment of a tensioning drive 10 in which a spring 200 having a spring end 201 is fixed in position, for example, in the region of the gas generator 20, in a portion between the gas generator 20 and the pushing piston 60 on the inner wall of the supply pipe 40 or in a region between the inner wall of the supply pipe 40 and the gas generator 20.

The other spring end 202 of the spring 200 is suspended in two through-openings 210 and 220 of the pushing piston 60 in such a manner that the two through-holes 210 and 220 are completely closed by the spring 200 or by the spring end 202 of the spring 200.

If the gas generator 20 is now activated and the pushing piston 60 moves in the direction of the arrow P, the spring 200 is tensioned. After a predetermined distance has been travelled by the pushing piston 60, the pushing piston 60 will become separated from the spring end 202 since the spring end 202 is pulled out of the two through-holes 210 and 220. As a result of the separation of the spring 200 from the pushing piston 60, the two through-holes 210 and 220 are released so that a gas flow through the pushing piston 60 is enabled.

Figure 5:
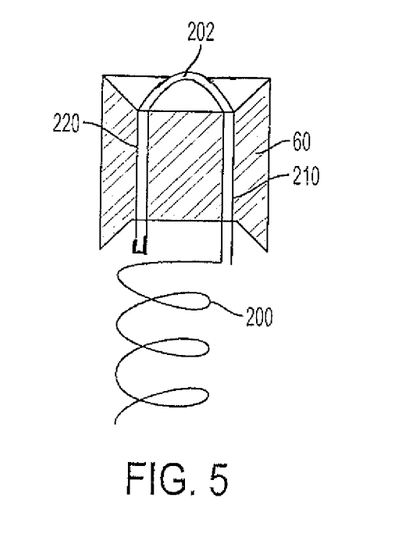
FIG. 5 shows in greater detail the pushing piston according to FIG. 4 with the spring suspended therein.

FIG. 5 shows in greater detail the embodiment of the pushing piston 60 according to FIG. 4 and the suspension of the spring end 202 of the spring 200 in the two through-holes 210 and 220 of the pushing piston 60. It can be seen that the spring end 202 can be pulled out of the two through-holes 210 and 220 by means of deformation of the spring end 202 as soon as the pushing piston 60 has travelled a predetermined distance which is determined by the length of the spring 200.

Figure 6:
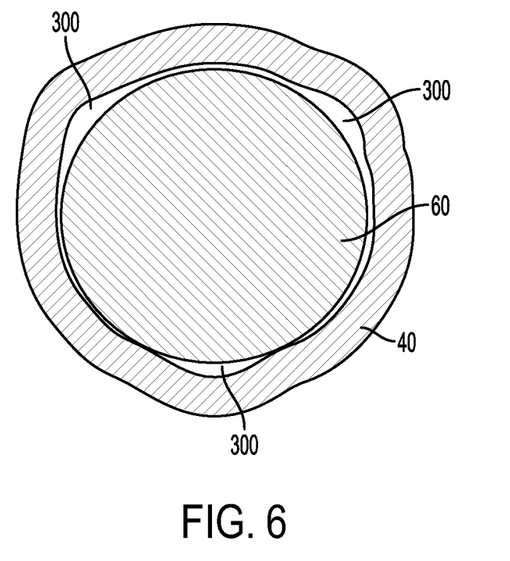
FIG. 6 shows an embodiment of a tensioning drive according to the invention, in which a pushing piston loses its sealing action with respect to the supply pipe after travelling a predetermined distance by the supply pipe increasing its cross-section after the predetermined distance.

FIG. 6 shows an embodiment of a tensioning drive in which a pushing piston 60 peripherally or radially brings about a sealing action with respect to a supply pipe 40 as long as the pushing piston 60 has not yet travelled a predetermined distance after a gas generator has been activated. When the predetermined distance is reached, the pushing piston 60 will enter a portion of the supply pipe 40 by the inner contour of the supply pipe 40 being expanded and the cross-section surface-area of the supply pipe 40 being greater than the cross-section surface-area of the pushing piston 60. As a result of the cross-section increase of the supply pipe 40, there are gap regions 300 between the inner face of the supply pipe 40 and the outer wall of the pushing member 60 so that a gas flow at the outer side past the pushing piston 60 is enabled.

Therefore, as soon as the pushing piston 60 has travelled a predetermined distance and has been introduced into the region of the supply pipe 40 with the gap regions 300, the pushing piston 60 loses its previously present sealing action so that gas of the gas generator can be guided past the pushing piston 60 at the outer wall side.

Figure 7:
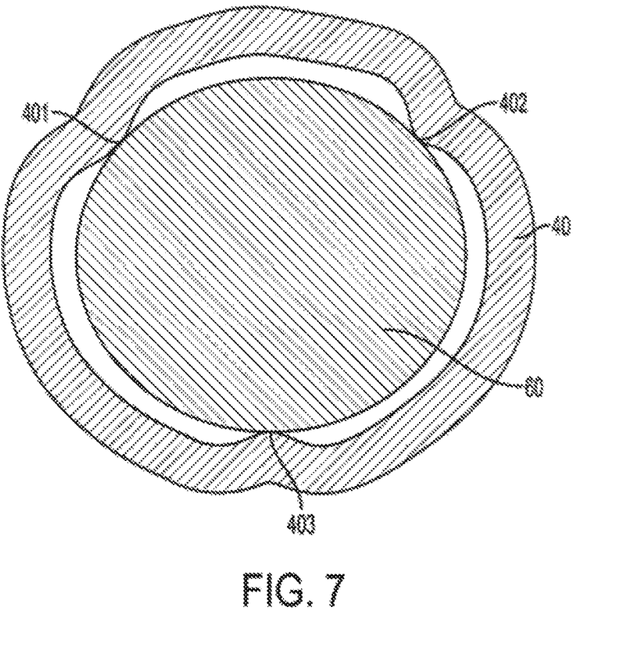
FIG. 7 shows an embodiment of a tensioning drive according to the invention in which a cross-section reduction in the supply pipe destroys or damages the pushing piston and, as a result of destruction or damage of the pushing piston, the sealing action of the pushing piston is lost completely or partially after a predetermined distance has been travelled.

FIG. 7 shows an embodiment of a tensioning drive in which the supply pipe 40 is pressed in at three locations at the outer side so that the inner contour of the supply pipe tapers. The portions of the supply pipe which are tapered at the inner wall side are indicated in FIG. 7 with the reference numerals 401, 402 and 403, respectively.

As soon as the pushing piston 60 has travelled a predetermined distance after the gas generator 20 has been activated and is introduced into the region of the tapered portions 401, 402 and 403 of the supply pipe 40, the outer face thereof is pressed in or destroyed by the tapered portions 401, 402 and 403 so that the pushing piston 60 loses its sealing action with respect to the supply pipe 40 as a result of damage or destruction.

Figure 8:
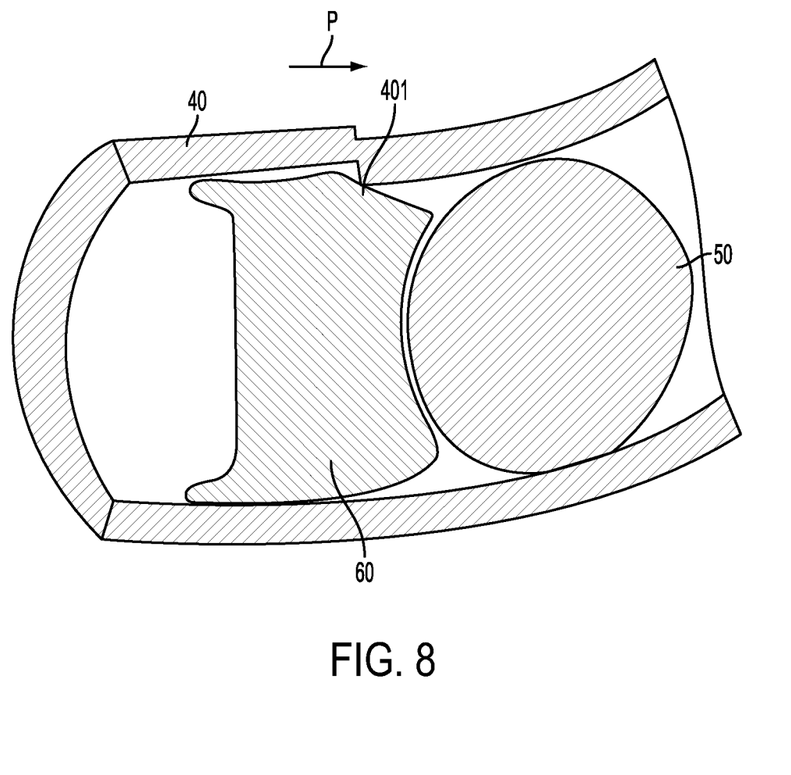
FIG. 8 shows by way of example a tapering of the supply pipe and the cooperation of the pushing piston with the supply pipe in the tapered region.

FIG. 8 is a longitudinal section of a construction variant having a tapered portion 401 in the supply pipe 40. It can be seen how the pushing piston 60 is introduced into the region having the tapered portion 401 in the direction of the arrow P and is thereby damaged at the outer wall side.

Figure 9:
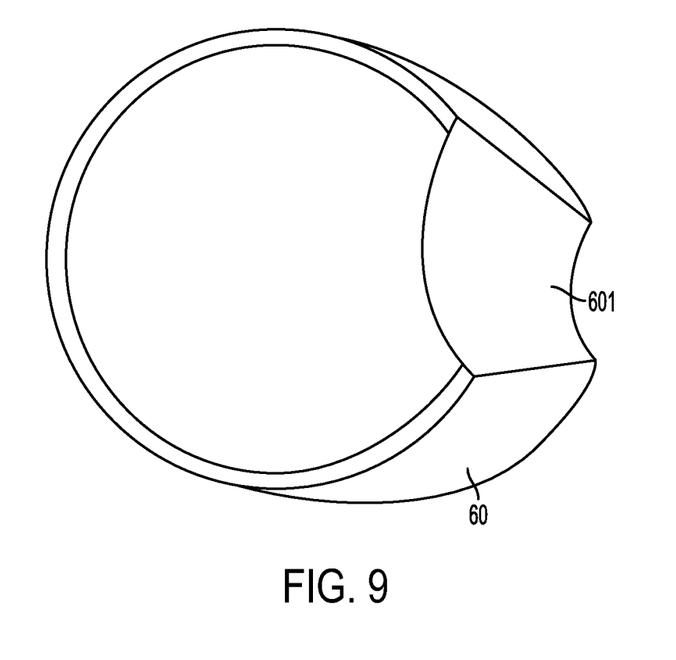
FIG. 9 shows an embodiment of a pushing piston which has been destroyed at the edge side by the tapering of the supply pipe according to FIG. 8 after travelling a predetermined distance, whereby the sealing action of the pushing piston with respect to the supply pipe is cancelled.

FIG. 9 is a three-dimensional, oblique side view of the pushing piston 60 according to FIG. 8 after the damage has occurred. An outer wall portion 601 of the pushing piston 60 can be seen and has been destroyed at the peripheral side by passing the tapered portion 401 of the supply pipe 40 according to FIG. 8.

LIST OF REFERENCE NUMERALS

10 Tensioning drive
20 Gas generator
30 Drive wheel
40 Supply pipe
41 Bent portion
50 Pushing member
50a Pushing member
50a' Pushing member
60 Pushing piston
60' Pushing piston
61 Front sealing portion
61' Front sealing portion
62 Rear sealing portion
62' Rear sealing portion
63 Through-hole
63' Through-hole
100 Member
101 Strand end
102 Strand end
110 Ventilation opening
200 Spring
201 Spring end
202 Spring end
210 Through-opening
220 Through-opening
300 Gap regions
401 Portion
402 Portion
403 Portion
601 Outer wall portion
G Gas flow
P Direction of arrow

The invention claimed is:

1. A tensioning drive for a safety belt device comprising:
a gas generator;
a drive wheel;
a supply pipe which connects the gas generator and the drive wheel;
a plurality of pushing members provided in the supply pipe;
the plurality of pushing members including a sealing pushing member that at least partially seals the supply pipe; and
at least one through-hole which extends through the sealing pushing member or between the sealing pushing member and an inner wall of the supply pipe which is sealed by a pushing member located upstream of the sealing pushing member;
wherein the tensioning drive is configured so that:
the pushing members are accelerated after the gas generator has been activated in order to drive the drive wheel,
the sealing action of the sealing pushing member is ended or reduced after the sealing pushing member has travelled a predetermined distance,
the sealing pushing member loses its sealing action when introduced into a bent portion of the supply pipe, and
the sealing pushing member remains fixed at a predetermined location in the bent portion of the supply pipe, and is separated from the pushing member located upstream of the sealing pushing member thereby resulting in the through-hole being unsealed.

2. A tensioning drive for a safety belt device comprising:
a gas generator;
a drive wheel;
a supply pipe which connects the gas generator and the drive wheel;
a plurality of pushing members provided in the supply pipe;
the plurality of pushing members including a sealing pushing member that at least partially seals the supply pipe;
wherein the tensioning drive is configured so that the pushing members are accelerated after the gas generator has been activated in order to drive the drive wheel, and the sealing action of the sealing pushing member is ended or reduced after the sealing pushing member has travelled a predetermined distance; and
at least one through-hole which extends through the sealing pushing member or between the sealing pushing member and an inner wall of the supply pipe;
wherein the through-hole is configured so that both before the gas generator is activated and before the predetermined distance has been completely travelled by the sealing pushing member, the through-hole is first sealed by a closure element which is fixed in position, and the through-hole is separated from the sealing pushing member after the predetermined distance has been travelled, whereby the through-hole is unsealed.

3. Tensioning drive according to claim 2, wherein the closure element comprises a spring which is fixed in position with one spring end and which is suspended with the other spring end thereof in a through-opening.

4. Tensioning drive according to claim 2, wherein
the closure element comprises a strand-like member which is fixed in position with one strand end, passes the through-hole with an intermediate portion and is located with the other strand end thereof at a side of the sealing pushing member remote from the gas generator, and
the tensioning drive is configured so that the sealing pushing member slides along the strand-like member away from the gas generator and,
the tensioning drive is configured so that after the predetermined distance has been travelled, the sealing pushing member is separated from the strand-like member, whereby the through-hole is unsealed.

5. Tensioning drive according to claim 2, wherein a portion of the closure element is located in a portion of the supply pipe located upstream of the sealing pushing member.

6. Tensioning drive according to claim 5, wherein the portion of the closure element located upstream of the sealing pushing member is fixed to the supply pipe, to the gas generator or between the supply pipe and the gas generator.

7. A tensioning drive for a safety belt device comprising:
a gas generator;
a drive wheel;
a supply pipe which connects the gas generator and the drive wheel;
a plurality of pushing members provided in the supply pipe; and
the plurality of pushing members including a sealing pushing member that at least partially seals the supply pipe;
wherein the tensioning drive is configured so that the pushing members are accelerated after the gas generator has been activated in order to drive the drive wheel, and the sealing action of the sealing pushing member is ended or reduced after the sealing pushing member has travelled a predetermined distance;
wherein the cross-sectional area of the supply pipe increases at a location after the sealing pushing member has travelled the predetermined distance; and
wherein the tensioning drive is configured so that the sealing pushing member loses its sealing action as a result of the increase in cross-sectional area of the supply pipe.

8. A tensioning drive for a safety belt device comprising:
a gas generator;
a drive wheel;
a supply pipe which connects the gas generator and the drive wheel;
a plurality of pushing members provided in the supply pipe;
the plurality of pushing members including a sealing pushing member that at least partially seals the supply pipe;
wherein the tensioning drive is configured so that the pushing members are accelerated after the gas generator has been activated in order to drive the drive wheel, and the sealing action of the sealing pushing member is ended or reduced after the sealing pushing member has travelled a predetermined distance;
wherein the cross-sectional area of the supply pipe decreases in a region of the supply pipe located after the sealing pushing member has travelled the predetermined distance; and
wherein the tensioning drive is configured so that the sealing pushing member is damaged at an outer side when introduced into the region of decreased cross-sectional area of the supply pipe and loses its sealing action as a result of this damage.

9. Tensioning drive according to claim 8, wherein the reduction of the cross-sectional area is based on an external stamping of the supply pipe, which tapers an inner wall of the supply pipe in an inward direction.

* * * * *